United States Patent [19]
Grosspietsch

[11] Patent Number: 5,996,468
[45] Date of Patent: Dec. 7, 1999

[54] PISTON-CYLINDER UNIT

[75] Inventor: Wolfgang Grosspietsch, Schweinfurt, Germany

[73] Assignee: Mannesmann Sachs AG, Schweinfurt, Germany

[21] Appl. No.: 08/986,804

[22] Filed: Dec. 8, 1997

[30] Foreign Application Priority Data

Dec. 21, 1996 [DE] Germany ............................ 196 53 944

[51] Int. Cl.$^6$ ...................................................... F16J 1/10
[52] U.S. Cl. .................................. 92/84; 92/128; 92/172
[58] Field of Search .............................. 92/84, 128, 129, 92/17.2, 170.1, 168; 60/533

[56] References Cited

U.S. PATENT DOCUMENTS

| | | | |
|---|---|---|---|
| 2,436,908 | 3/1948 | Van Weenen et al. ...................... | 92/84 |
| 4,468,927 | 9/1984 | Farr ........................................... | 92/138 |
| 4,527,395 | 7/1985 | Gaiser et al. ........................... | 92/170.1 |
| 5,083,433 | 1/1992 | Leigh-Monstevens ..................... | 60/588 |
| 5,290,120 | 3/1994 | Osterfeld et al. ......................... | 403/133 |
| 5,335,585 | 8/1994 | Fischenich et al. ...................... | 92/128 |
| 5,499,570 | 3/1996 | Bergelin et al. ............................. | 92/84 |

FOREIGN PATENT DOCUMENTS 195 16 391  5/1996  Germany .

*Primary Examiner*—Thomas E. Denion
*Attorney, Agent, or Firm*—Cohen, Pontani, Lieberman & Pavane

[57] ABSTRACT

A piston-cylinder unit for a hydraulic system, especially for the actuation of clutches in motor vehicles, comprises a housing with an axially stepped bore hole in which a piston fastened to a tappet is guided so as to be axially displaceable. The piston displaces a fluid in the cylinder of the housing by its front end. The cylinder includes at least one pressure line connector, a connection to a fluid chamber, and at least one cup which is sealingly arranged in the housing relative to the outer surface of the piston. Both the housing and the piston comprise assemblies made of a plurality of parts. The assemblies are constructed by inserting the plurality of parts in order into a larger part and press fitting them in place.

7 Claims, 3 Drawing Sheets

PISTON-CYLINDER UNIT

BACKGROUND OF THE INVENTION

1. Field of the Invention

The invention is directed to a piston-cylinder unit for transmitting hydraulic control forces.

2. Description of the Related Art

German reference DE 195 16 391.5 discloses a cylinder for hydraulic assemblies, especially for motor vehicles, for providing controlling pressure to the hydraulic assemblies. The prior art cylinder comprises a cylinder housing, a piston, a piston rod cooperating with the piston, and a dust seal arranged between the piston rod and cylinder housing. In particular, the prior art is directed to a master cylinder for controlling a clutch release via a slave cylinder. The piston of the master cylinder comprises an outer tube which is inserted over an inner tube. The inner tube is pressed against a resilient connection part between the head of the piston and a lock or stop in the outer tube to absorb hydraulic pressure impact shocks between the piston and the piston rod.

SUMMARY OF THE INVENTION

It is an object of the present invention to provide an arrangement for a housing and a piston arranges therein, in which all parts are inserted and fixed in place for an uncomplicated assembly.

In the present invention, the piston cylinder is constructed such that both the piston and the housing are mounted together in a simple manner as a subassembly.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings.

A piston-cylinder unit for hydraulic control is described as an embodiment example in the accompanying drawings.

DETAILED DESCRIPTION OF THE PRESENTLY PREFERRED EMBODIMENTS

Figures 1A, 1B:
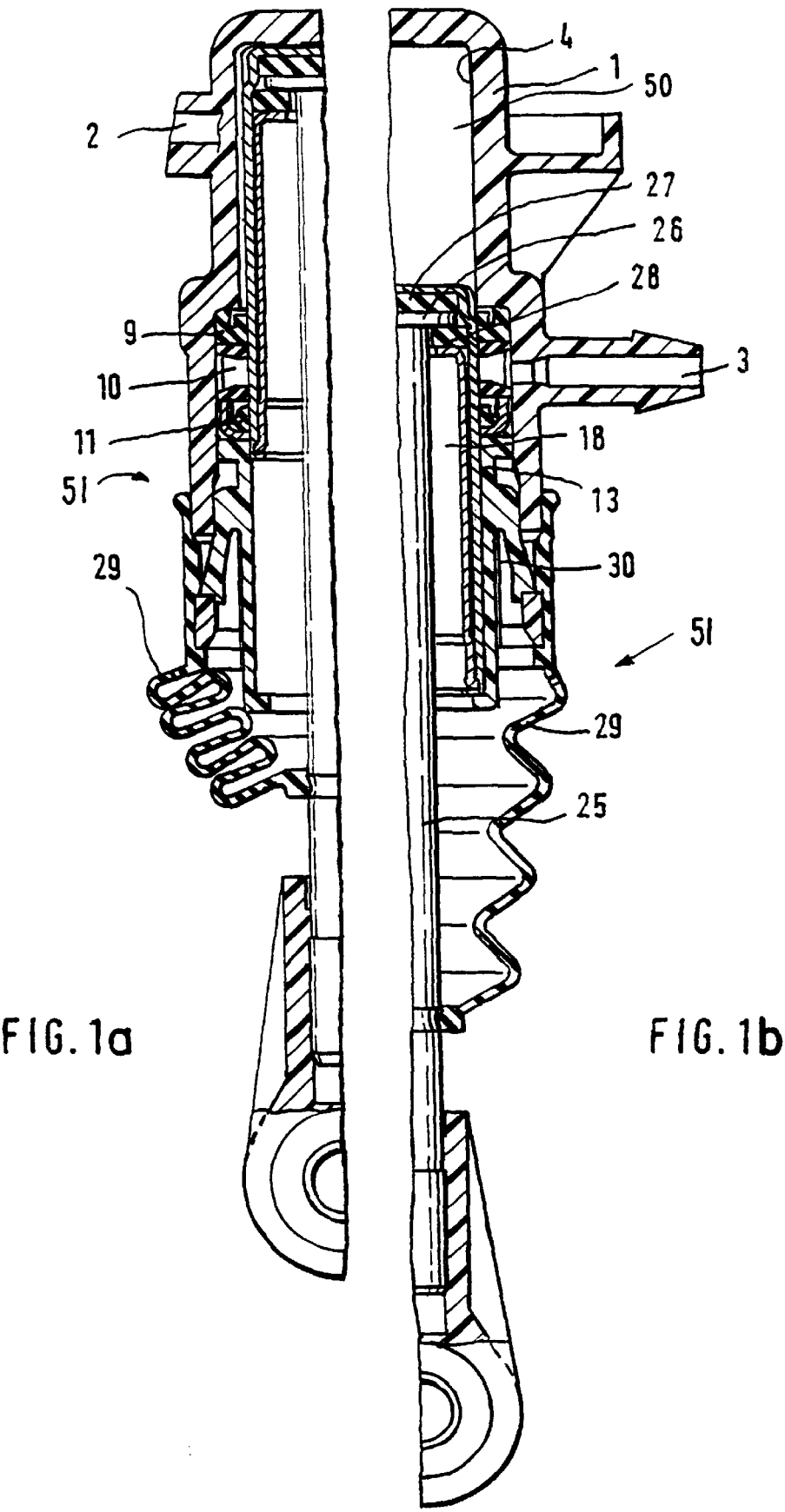
FIG. 1a shows the left side of a cylinder-piston unit with a housing as cylinder and with a piston connected with a tappet with the piston fully inserted into the cylinder.
FIG. 1b shows the right side of the cylinder-piston unit of FIG. 1a, with the piston fully withdrawn from the cylinder.
Figure 3:
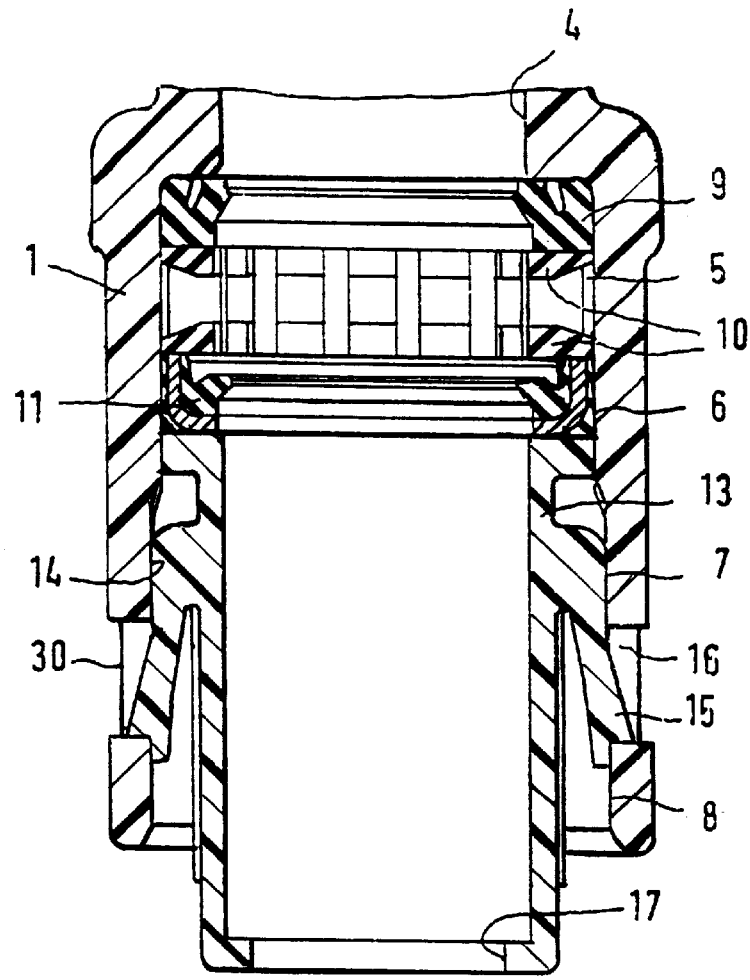
FIG. 3 shows the housing of the piston-cylinder unit of FIG. 1a with a primary cup, a spacer ring, a secondary cup, and a guide sleeve in an assembled state.
Figure 4:
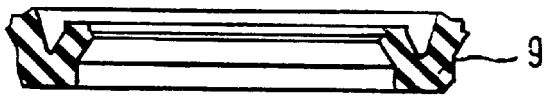
FIG. 4 shows the primary cup by itself.
Figure 5:
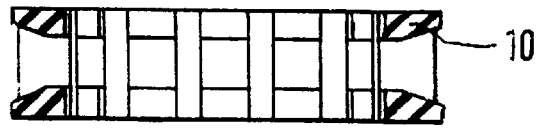
FIG. 5 shows the spacer ring by itself.
Figure 6:
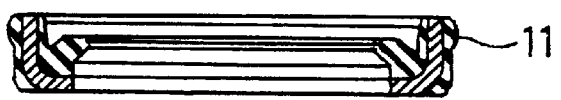
FIG. 6 shows the secondary cup by itself.

FIGS. 1a and 1b show a cylinder-piston unit 51 for use as a master cylinder in the actuation of a slave cylinder which drives a release mechanism in a motor vehicle clutch. In this cylinder-piston unit 51, a piston 18 works against fluid in a housing 1 to actuate the slave cylinder (not shown). The housing 1 of the cylinder-piston unit 51 comprises a first pressure connection 2 and a second pressure connection 3, at least one of which is connected to the slave cylinder for transmission of the control fluid within the housing 1. Referring also to FIG. 3, a bore hole 50 in the housing 1 comprises a first portion with a first diameter 4, which acts as a cylinder running path, a second portion with a second diameter 5 for receiving a primary cup 9 and a spacer ring 10, a third portion having a third diameter 6 for receiving a secondary cup 11, a fourth portion with a fourth diameter 7 for centering a guide sleeve 13, and a fifth portion with a fifth diameter 8 for receiving the above-mentioned internal parts during assembly of the cylinder-piston unit 51. The housing 1 further includes housing windows 16 for receiving snap-in locking hooks 15 which are connected with the guide sleeve 13. The locking hooks 15 engage the housing windows 16 for fixedly holding the guide sleeve 13 in the housing 1 by preventing guide sleeve 13 from moving in a direction opposite to the direction in which the parts are inserted during assembly. The guide sleeve 13 is centered in the housing 1 and resides at the third portion 6. Guide sleeve 13 also has a shoulder with a diameter 14 which resides at the fourth portion 7 to further guarantee that the parts are centered on insertion. The guide sleeve 13 usually comprises a plastic material. Finally, the guide sleeve 13 also includes a limiting collar 17 for supporting a piston 18 at the end of guide sleeve 13 which projects out of the housing 1.

Figure 2:
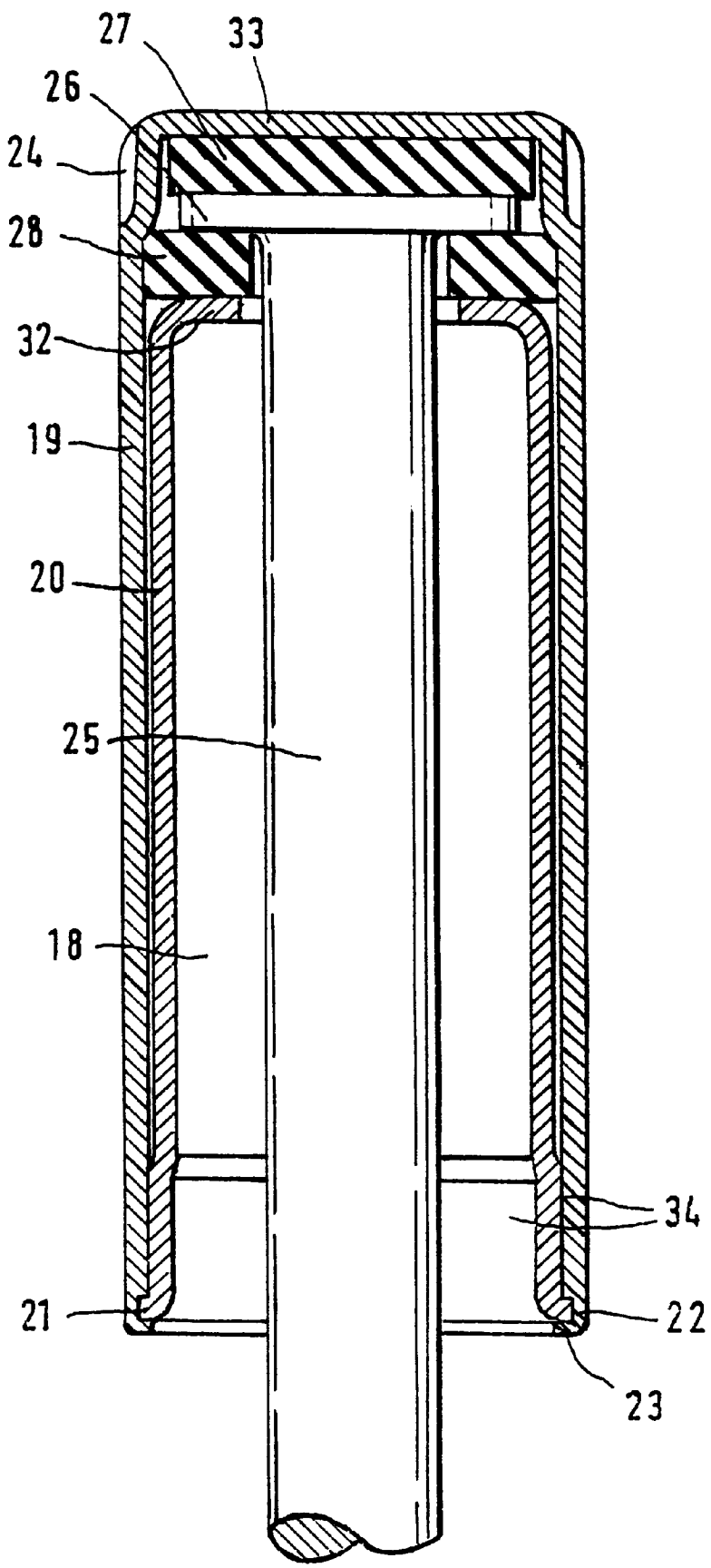
FIG. 2 shows the piston with the tappet as an assembly.

According to FIG. 2, the piston 18 comprises a deep-drawn piston section 19 which has a base 33 at one end. The deep-drawn piston section 19 further comprises radially arranged recesses 24 connecting to the base 33 at the outer diameter of base 33. A slot 22 on the side of the deep-drawn piston 19 is located on the end of deep-drawn piston that is opposite that of the base 33. The piston 18 further comprises a tappet 25 with a mushroom-shaped shoulder 26 which is positioned within the deep-drawing piston section 19. A deep-drawn bushing 20 is inserted within the deep-drawing piston section 19. The deep-drawn bushing has an edge positioned below the mushroom-shaped shoulder 26 of the tappet 25 when the deep-drawn bushing 20 is fully inserted in the deep-drawn piston section 19. The deep-drawn piston 19 is resiliently connected with the tappet 25 by a rubber gasket 27 inserted between the base 33 and the top end of the mushroom-shaped shoulder 26 and by a rubber gasket 28 inserted between the other side of the shoulder 26 and an edge 32 of the deep-drawn bushing 20. This deep-drawn bushing 20 further includes, at the end opposite the edge 32, a collar 21 which is pressed into the slot 22 of the deep-drawn piston 19 for proper positioning. The deep-drawn bushing 20 also includes a thickened portion or bulge 34 at a short extension adjoining the collar 21. The bulge 34 must be press fit into the deep-drawn piston 19. During the assembly, the deep-drawn bushing 20 is inserted into the deep-drawn piston section 19 and pressed into the deep-drawn piston section 19 until the collar 21 meets the slot 22. A remainder of the tube material of the deep-drawn piston section 19 which extends beyond the collar 21 at the slot 22 is rolled onto the collar 21 of the deep-drawn bushing 20 to form a rolled collar 23. The piston 18 which is mounted in this way is thus connected with the shoulder 26 of the tappet 25 to be free of play by the rubber parts 27 and 28 which are pressed between the edge 32, the mushroom-shaped shoulder 26, and the base 33 under pretensioning. However, slight angular deviations of the tappet 25 are possible when manipulated from the outside without affecting the functioning of the piston-cylinder unit 51.

Around the outer circumference of the housing 1, in the region of the windows 16, the housing 1 includes a joint diameter 30 on which a bead-like bulge of a bellows 29 engages. The bellows 29 accordingly closes off the windows 16. The other side of the bellows 29 is sealingly connected to the tappet 25, thereby protecting the entire area of the housing 1 on the operating side from the penetration of dirt.

FIGS. 3, 4, 5 and 6 show how the primary cup 9, the spacer ring 10, the secondary cup 11 and the guide sleeve 13 are fitted in the housing 1. The housing 1 is stepped with diameters 5, 6, 7 and 8 such that each of the primary cup 9, the spacer ring 10, the secondary cup 11 and the guide sleeve 13 drop down until just before their definitive or final position in the housing 1 due to the force of gravity when the housing 1 is arranged with its opening at the top. Thus, in the proposed mechanical method for mounting the assembly in the housing 1, the primary cup 9, the spacer ring 10, the secondary cup 11 and the guide sleeve 13 are mechanically fed and released in sequence into the opening of the housing 1 which is held at the top during assembly, so that the parts fall into the housing 1 until just above their position in the bore hole 50 of the housing 1 by gravitational force. To properly install the guide sleeve 13 in this manner, the snap-in locking hooks 15 must be aligned relative to the positions of the housing windows 16 before the guide sleeve 13 is dropped in. After the primary cup 9, the spacer ring 10, the secondary cup 11 and the guide sleeve 13 are properly inserted into the housing 1, a single pressing action on the limiting collar 17 of the guide sleeve 13 is sufficient to bring the primary cup 9, the spacer ring 10, the secondary cup 11 and the guide sleeve 13 into their operating positions by engaging the locking hooks 15 with the housing windows 16. It must be ensured in the assembly device when mounting the housing 1 with the primary cup 9, the spacer ring 10, the secondary cup 11 and the guide sleeve 13, that the piston 18 is already mounted so that the tappet 25 projects out through the opening of the guide bush in the limiting collar 17.

According to FIG. 2, the piston 18 is pre-assembled using the same principle. The rubber gasket 27, the tappet 28 with its shoulder 26 and the rubber gasket 28 are inserted into the deep-drawing piston 19 which is positioned with its opening at the top by placing each part in the deep-drawn piston 19 and letting them fall. The deep-drawn bushing 20 does not fall into position because of the bulge 34. The deep-drawn bushing 20 must be brought into its operating position by a pressing device. The stop of the insertion of the deep-drawn bushing into the deep-drawn piston 19 is effected by the collar 21 in the slot 22, wherein the rubber parts 27 and 28 are pressed under pretensioning when the deep-drawn bushing 20 is in its operational position. This assembly of the piston 18 is secured in place by rolling the protruding diametrical end of the deep-drawn piston section 19 over the collar 21 of bushing 20 to form a rolled collar 23.

The characteristics of the deep-drawing piston 19 can be improved by using a suitable choice of material such as a stainless deep-drawing grade steel or a normal deep-drawing steel. The deep-drawing piston may also be coated by a surface treatment material for improving sliding ability and protection against corrosion. Surface coatings that may be used for this purpose are a chemical nickel, a hard chromium plating, a carbonitriding with or without postoxidation, galvanic nickel, or a slide coating.

The invention is not limited by the embodiments described above which are presented as examples only but can be modified in various ways within the scope of protection defined by the appended patent claims.

I claim:
1. A piston-cylinder unit, comprising:
   a housing having a blind cylindrical bore having a closed end and an open end;
   a piston comprising a tappet extending from one end of said piston and a base surface at the other end of said piston for working against a fluid in said cylindrical bore, said tappet comprising a tappet rod having a first diameter and an end section having at least one radial measurement greater than said first diameter;
   at least one pressure line connected to said cylindrical bore;
   at least one seal enclosing said piston;
   a guide sleeve operatively connected in said cylindrical bore for securing an axial position of said at least one seal;
   a dust protecting device operatively connected between said housing and said tappet for preventing dust from entering said housing; and
   said piston comprising a deep-drawn piston section and a deep-drawn bushing for insertion into said deep-drawn piston section, said deep-drawn piston section having a closed base end at said base surface of said piston and an open end, said deep-drawn bushing having a radially enlarged short bulge section at said open end of said deep-drawn piston section and said deep-drawn bushing being fully insertable into said deep-drawn piston section by force-fitting said enlarged short bulge section into said deep-drawn piston section such that said end section of said tappet is held axially between said closed end of said deep-drawn piston section and said deep-drawn bushing.

2. The piston-cylinder unit according to claim 1, wherein said end section of said tappet comprises a mushroom-shaped shoulder formed integral with said tappet rod;
   said mushroom-shaped shoulder being pretensionedly and swivelably held within narrow limits between a rubber gasket at the base end of the deep-drawn piston section and a rubber ring at an edge of the deep-drawn bushing, wherein the rubber gasket, the tappet with its mushroom-shaped shoulder, the rubber ring, and the deep-drawn bushing are arranged on one after the other.

3. The piston-cylinder unit of claim 2, wherein a bushing collar at the bottom of the deep-drawn bushing engages a slot at the deep-drawn piston section and, in the pressing direction, forms a stop whereby said deep-drawn bushing is securable on said deep-drawn piston section by an end portion of the deep-drawn piston section that is operatively rolled onto said bushing collar to form a rolled collar over the bushing collar.

4. The piston-cylinder unit according to claim 3, characterized in that the deep-drawn piston comprises a surface coating at its outer surface for improving protection against corrosion and sliding capacity in the cylinder bore.

5. A piston-cylinder unit, comprising:
   a housing having a blind cylindrical bore having a closed end and an open end;
   a piston comprising a tappet extending from one end of said piston and a base surface at the other end of said piston for working against a fluid in said cylindrical bore;
   at least one pressure line connected to said cylindrical bore;
   at least one seal enclosing said piston;
   a guide sleeve operatively connected in said cylindrical bore for securing an axial position of said at least one seal;

a dust protection device operatively connected to said tappet and said housing for preventing dust from entering said housing;

a first portion of said bore adjacent the closed end having a first diameter, a second portion adjacent said first portion of said bore having a second diameter for receiving a primary cup and a spacer ring, a third portion adjacent said second portion of said bore having a third diameter for receiving a secondary cup, a fourth portion adjacent said third portion of said bore having a fourth diameter for receiving the guide sleeve, and a fifth portion adjacent said fourth portion of said bore having a fifth diameter for holding the parts including the primary cup, the spacer ring, the secondary cup, and the guide sleeve during assembly of the piston cylinder unit;

the first, second, third, fourth, and fifth diameters increasing in the above-indicated sequence; and axial extensions of each of said second, third, and fourth portions extending only a length required to receive said primary cup and said spacer ring, said secondary cup, and said guide sleeve, respectively.

6. The piston-cylinder unit of claim 5, wherein said tappet comprises a tappet rod having a diameter of a first length and an end section having at least one radial measurement greater than said first length; and said piston comprising a deep-drawn piston section and a deep-drawn bushing for insertion into said deep-drawn piston section, said deep-drawn piston section having a closed base end at said base surface of said piston and an open end, said deep-drawn bushing having a radially enlarged short bulge section at said open end of said deep-drawn piston section and said deep-drawn bushing being fully insertable into said deep-drawn piston section by force-fitting said enlarged short bulge section into said deep-drawn piston section such that said end section of said tappet is held axially between said closed end of said deep-drawn piston section and said deep-drawn bushing.

7. A process for mechanically assembling a primary cup, a spacer ring, a secondary cup, and a guide sleeve in a housing for a piston-cylinder arrangement having a cylindrical bore, comprising the steps of:

arranging the housing with its largest diameter of the cylindrical bore at the top end;

placing the primary cup coaxially over the cylindrical bore and releasing such that the primary cup falls to a resting place in the cylindrical bore;

placing the spacer ring coaxially over the cylindrical bore and releasing such that the spacer falls onto the primary cup;

placing the secondary cup coaxially over the cylindrical bore and releasing such that the secondary cup falls onto the spacer ring;

placing the guide sleeve coaxially over the cylindrical bore such that the snap-in locking hooks with windows of the cylindrical housing to form a snap-in connection of the guide sleeve with the housing and releasing such that the guide sleeve falls onto the secondary cup; and pressing in the guide sleeve until said snap-in locking hooks engage said windows.

\* \* \* \* \*